United States Patent
Shintani et al.

(10) Patent No.: US 7,610,829 B2
(45) Date of Patent: Nov. 3, 2009

(54) TRANSMISSION

(75) Inventors: Masanori Shintani, Okazaki (JP); Koji Kasuya, Okazaki (JP)

(73) Assignees: Mitsubishi Jidosha Kogyo Kabushiki Kaisha, Tokyo (JP); Mitsubishi Jidosha Engineering Kabushiki Kaisha, Aichi (JP)

( * ) Notice: Subject to any disclaimer, the term of this patent is extended or adjusted under 35 U.S.C. 154(b) by 23 days.

(21) Appl. No.: 12/051,236

(22) Filed: Mar. 19, 2008

(65) Prior Publication Data

US 2008/0302199 A1    Dec. 11, 2008

(30) Foreign Application Priority Data

Jun. 11, 2007    (JP) ............... P2007-153780

(51) Int. Cl.
*B60K 20/00*    (2006.01)
(52) U.S. Cl. ............... 74/473.36; 74/469; 74/471 R; 74/473.1
(58) Field of Classification Search ............... 74/469, 74/471 R, 473.1, 473.36, 473.37
See application file for complete search history.

(56) References Cited

U.S. PATENT DOCUMENTS 6,845,685 B2 * 1/2005 Brandwitte et al. ...... 74/473.25
7,195,103 B2 * 3/2007 Bathe et al. ............... 184/13.1
7,353,726 B2 * 4/2008 Beer et al. .................. 74/340

FOREIGN PATENT DOCUMENTS

| EP | 1308651 | 5/2003 |
|----|---------|--------|
| JP | 2001-304411 A | 10/2001 |
| JP | 2002-089594 | 3/2002 |
| JP | 2006-506591 | 2/2006 |

* cited by examiner

*Primary Examiner*—David M Fenstermacher
(74) *Attorney, Agent, or Firm*—Birch, Stewart, Kolasch & Birch, LLP

(57) ABSTRACT

A transmission, includes: a plurality of shift members, adapted to be moved in a shifting direction and a selecting direction; a shift lug, having a pair of claw portions spaced apart from each other in the shifting direction; and a shift fork, connected to the shift lug via a shift rail. The shift members are moved by an actuator so that one of the shift members pushes one of the claw portions in the shifting direction to thereby selectively move the shift lug in the shifting direction so as to cause the shift fork to perform a gear shift operation via the shift rail. The shift members are disposed as to be offset from each other in the shifting direction.

5 Claims, 9 Drawing Sheets

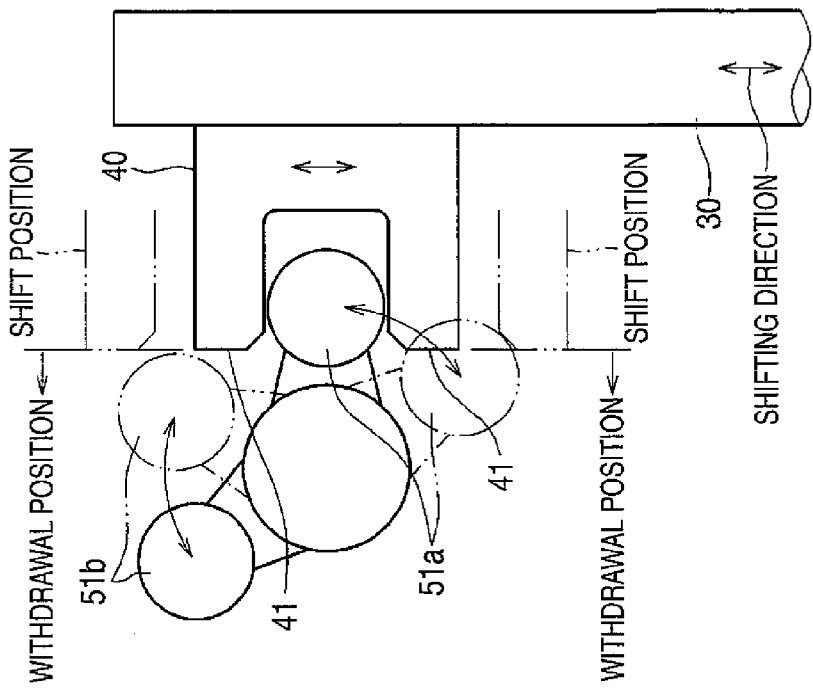
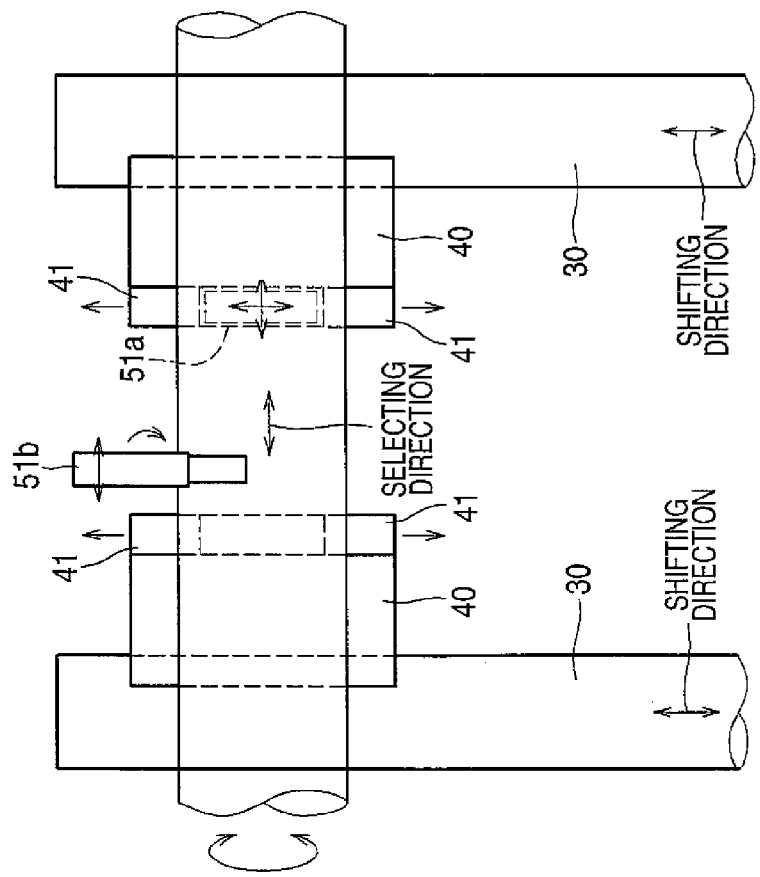
FIG. 3A
FIG. 3B

SHIFTING DIRECTION

SHIFTING DIRECTION

TRANSMISSION

BACKGROUND OF THE INVENTION

The present invention relates to a mechanical transmission, and more particularly to the construction of a transmission unit of a transmission which includes dual clutches.

There are known mechanical automatic transmissions which use no torque converter, as transmissions for vehicles. In these mechanical automatic transmissions, operations (gear selection and shift) in a transmission of a manual transmission and engagement and disengagement of clutches are performed by an actuator, whereby automatic gear changes requiring no torque converters are enabled. The transmission includes a shift shaft which can be moved in a shifting direction and a selecting direction through sliding and rotating, a plurality of shift lugs (shift brackets) which are arranged in the selecting direction, and shift rails (rods) which connect the shift lugs and shift forks, respectively. Furthermore, a shift member (shifter), which is formed into a pawl shape, is provided on the shift shaft in such a manner as to project outwards, and a pair of claw portions is provided on each shift lug in such a manner as to be spaced apart from each other in the shifting direction. In addition, the shift shaft is moved by the actuator in the mechanical automatic transmission, whereby the claw portion of the shift lug is selectively pushed to be moved in the shifting direction by the shift member, so that the shift fork is operated to be moved selectively.

Furthermore, in the mechanical automatic transmissions, dual clutch type automatic transmissions having two clutches have been developed. In the dual clutch type automatic transmissions, from a state in which one gear is engaged via one of the clutches, a target gear is engaged via the other clutch, and when the rotational speed of the target gear comes to synchronize with that of the gear engaged via the one clutch, the one clutch is disengaged, whereby no neutral state takes place during the gearchange, and a gearchange is enabled in which there is virtually no interruption of power flow as the gearchange takes places.

In this way, in the dual clutch type automatic transmission, since shift operations for the two gears are performed sequentially during the gearchange, the movements of the shift member become complex, and as a result, there is caused a fear that the shifting time becomes long. To cope with this, there has been proposed a mechanical automatic transmission in which a space between a pair of claw portions provided on each shift lug is expanded in the shifting direction, so that a shift member can enter between the pair of claw portions on the shift lug for a target gear which is in a neutral position only by shifting the shift member from between the pair of claw portions of the shift lug which is in a shifted state in the selecting direction, the movements of the shift member being thereby simplified (refer to JP-A-2001-304411).

In JP-A-2001-304411, however, in order for the shift member to enter between the pair of claw portions when the shift member is moved to the selecting direction, the pair of claw portions must be disposed in such a manner that the space between the pair of claw portions is expanded relatively wide. Consequently, when a gear is engaged, since a distance over which the shift member is moved from its neutral position to the claw portion for abutment becomes relatively long, there is caused a fear that a quick shift is not attained.

In addition, in the event that the pair of claw portions are disposed in such a manner that the space therebetween is expanded relatively wide, force transmitted from the shift member to the claw portion becomes small, and the efficiency is deteriorated. Hereinafter, the reason for the deteriorated efficiency will be described using FIG. 9. FIG. 9 is a schematic diagram showing the construction of a shift mechanism of a shift lug according to the related art (JP-A-2001-304411).

As is shown in FIG. 9, in the mechanical automatic transmission described in JP-A-2001-304411, a construction is adopted in which a shift member 71 is caused to swing by rotation of a control shaft 70 so as to push a claw portion 73 of a shift lug 72 in a shifting direction. In the construction like this, when a space L1 between a pair of claw portions 73 is increased, the shift member 71 is caused to push the claw portion 73 while the shift member 71 is tilted largely towards the shifting direction. Assuming that a force exerted on the claw portion 73 by a rotational torque T of the control shaft 70 then is a tangential force F, a distance from a contact point a between the shift member 71 and the claw portion 73 to an axial center C of the control shaft 70 is a distance L2, and a tilt angle of a line which connects the contact point a with the axial center C towards the shifting direction is an angle $\alpha$, a component of the tangential force F in the shifting direction, that is, a component force P1 which is a force which shifts the shift lug 72 in the shifting direction is obtained by the following equation (1).

$$P1 = F \times \cos \alpha = T \times \cos \alpha / L2 \qquad (1)$$

In the equation (1), in the event that the distance L2 is substantially constant irrespective of the angle $\alpha$, it is found that when the angle $\alpha$ is increased within a range of 0 to 90 degrees, the component force PT is decreased. Consequently, in the event that the space L1 between the pair of claw portions 73 is increased as in JP-A-2001-304411, the force pushing the claw portion 73 towards the shifting direction is decreased, and hence, it becomes difficult to move the shift lug 72 in the shifting direction with good efficiency.

SUMMARY

It is therefore an object of the invention to provide a transmission which enables quick and efficient gearchanges by simplifying the movements of the shift member without expanding largely the space between the pair of claw portions provided on the shift lug.

In order to achieve the object, according to the invention, there is provided a transmission, comprising:

a plurality of shift members, adapted to be moved in a shifting direction and a selecting direction;

a shift lug, having a pair of claw portions spaced apart from each other in the shifting direction; and a shift fork, connected to the shift lug via a shift rail, wherein the shift members are moved by an actuator so that one of the shift members pushes one of the claw portions in the shifting direction to thereby selectively move the shift lug in the shifting direction so as to cause the shift fork to perform a gear shift operation via the shift rail, and the shift members are disposed as to be offset from each other in the shifting direction.

BRIEF DESCRIPTION OF THE DRAWINGS

FIGS. 3A and 3B are diagrams showing the configurations of the shift shaft and the shift lug according to a first embodiment of the invention. FIG. 3A is a plan view and FIG. 3B is a side view.

DETAILED DESCRIPTION OF PREFERRED EMBODIMENTS

Hereinafter, an embodiment of the invention will be described based on the accompanying drawings.

Figure 1:
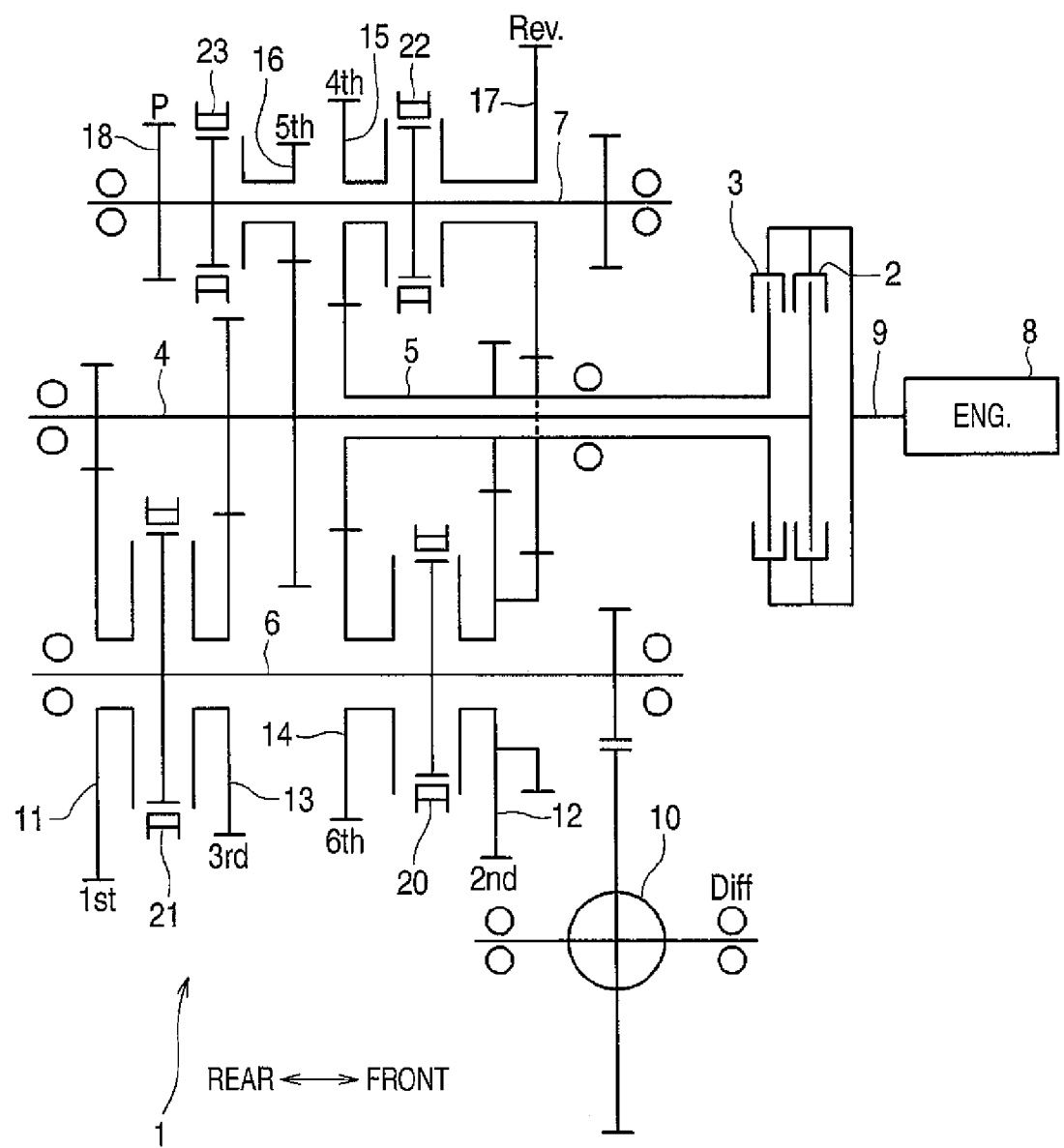
FIG. 1 is an exemplary diagram of a dual clutch type automatic transmission with six forward gears and one reverse gear to which the invention is applied.

FIG. 1 is an exemplary diagram of a transmission unit 1 of a dual clutch type transmission with six forward gears and one reverse gear to which the invention is applied.

As is shown in FIG. 1, the transmission unit 1 includes two clutches 2, 3, two main shafts 4, 5 which are disposed concentrically and two counter shafts 6, 7. Power is configured to be delivered to the first main shaft 4 from an output shaft 9 of an engine 8 via the first clutch 2, while the power is configured to be delivered to the second main shaft 5 from the output shaft 9 via the second clutch 3.

The first counter shaft 6 and the second counter shaft 7 are disposed spaced apart in such a manner that their axes become parallel to those of the first main shaft 4 and the second main shaft 5 and are configured to be able to deliver the power to a differential 10 which is disposed at a final stage of the transmission unit 1. A first speed gear 11, a second speed gear 12, a third speed gear 13 and a sixth speed gear 14 are pivotally supported on the first counter shaft 6 in such a manner as to rotate thereon. A fourth speed gear 15, a fifth speed gear 16 and a reverse gear 17 are pivotally supported on the second counter shaft 7 in such a manner as to rotate thereon, and a parking gear 18 is fixed to the second counter shaft 7.

In addition, four shift forks 20 to 23 are provided in the transmission unit 1. A first shift fork 20 and a second shift fork 21 are placed in such a manner as to slide to be moved along the axis of the first counter shaft 6, and a third shift fork 22 and a fourth shift fork 23 are placed in such a manner as to slide to be moved along the axis of the second counter shaft 7. By sliding to move these shift forks 20 to 23, the second speed gear 12 and the sixth speed gear 14 are allowed to selectively come in or out of engagement with the first counter shaft 6 (gearchange operations) by the first shift fork 20, and the first speed gear 11 and the third speed gear 13 are allowed to selectively come in or out of engagement with the first counter shaft 6 (gearchange operations) by the second shift fork 21. In addition, the fourth speed gear 15 and the reverse gear 17 are allowed to selectively come in or out of engagement with the second counter shaft 7 (gearchange operations) by the third shift fork 22, and the fifth speed gear 16 and the parking gear 18 are allowed to selectively come in or out of engagement with the second counter shaft 7 (gearchange operations) by the fourth shift fork 23. The first speed gear 11, the third speed gear 13 and the fifth speed gear 16 are connected to the first main shaft 4, while the second speed gear 12, the fourth speed gear 15, the sixth speed gear 14 and the reverse gear 17 are connected to the second main shaft 5.

Namely, in the transmission unit 1 of the dual clutch type transmission, gearchanges to/from the first speed gear, the third speed gear and the fifth speed gear can selectively be attained by way of the first clutch 2, while gearchanges to/from the second speed gear, the fourth speed gear, the sixth speed gear and the reverse gear can selectively be attained by way of the second clutch 3.

Figure 2:
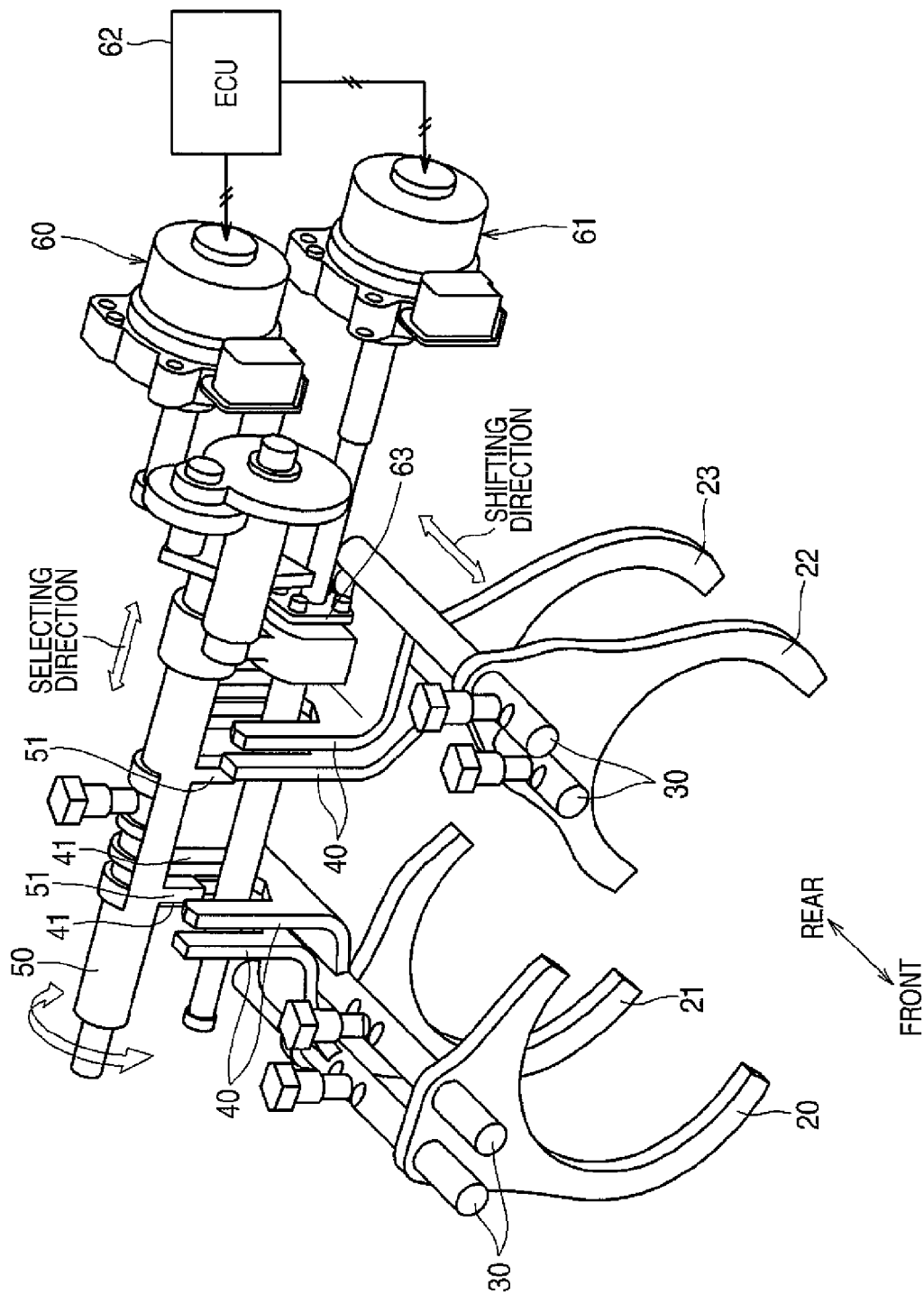
FIG. 2 is a perspective view showing the construction of an operating mechanism of shift forks.

FIG. 2 is a perspective view showing the construction of an operating mechanism of the shift forks 20 to 23.

As is shown in FIG. 2, the shift forks 20 to 23 are fixed, respectively, to four shift rails 30 which are disposed in such a manner as to move in a back and forth direction (a shifting direction), and furthermore, shift lugs 40 are provided on the shift rails 30, respectively. The shift lug 40 is a sheet material which is formed into a U-shape to open upwards and is disposed in such a manner that claw portions 41 provided at an upper end portion thereof align in the back and forth direction. The shift lugs 40 are disposed in such a manner that center lines of their openings in the back and forth direction align with one another in such a state that they are disengaged (or in neutral positions).

A shift shaft 50 is supported above the shift lugs 40 in such a manner as to extend over the center lines of the openings in the back and forth direction so as to be rotated and moved in an axial direction (a selecting direction). Pawl-like control fingers 51 (shift members) are formed on the shift shaft 50 in such a manner as to project downwards therefrom. Two control fingers 51 are provided in such a manner as to be spaced apart from each other in the axial direction, and the control fingers 51 are disposed in such a way that one control finger 51 is inserted into the openings of the two shift lugs 40.

When the shift shaft 50 is slid in the axial direction so that the control finger 51 is positioned in the opening of the shift lug 40 for a target gear and the shift shaft 50 is then rotated to push the claw portion 41 of the shift lug 40 with the control finger 51, the shift lug 40 can be moved in the back and forth direction to a shift position. In association with the shift of the shift lug 40, the shift fork 20 to 23 corresponding to the shift lug 40 so moved is moved in the back and forth direction via the corresponding shift rail 30, whereby the gear corresponding to the shift fork so moved can be engaged or disengaged to perform a gearchange operation.

The shift shaft 50 is driven to rotate by a shifting motor 60 and is driven to slide in the axial direction by a selecting motor 61 via a ball screw 63. The shifting motor 60 and the selecting motor 61 are controlled to be driven by an ECU 62 based on the operation of a gearshift lever, not shown, and the running conditions of the engine 8 and are controlled to be driven in such a manner that gearchanges take place sequentially, for example, when a gearchange to a target gear is implemented. The ECU 62 also controls the operations of the clutches 2, 3 when gearchanges take place. Specifically, in changing gears, the ECU 62 controls the other clutch 3 or 2 to be engaged to engage the next gear from a state resulting before a gearchange has taken place in which one of the clutches 2 or 3 is engaged while maintaining the engagement of a gear which is engaged by the one of the clutches 2 or 3. Then, at a point in time at which the rotational speed of the gear that has just been engaged comes to synchronize with that of the previous gear, the latter gear is disengaged so as to realize a gearchange in which there is virtually no interruption of power flow as the gearchange takes place.

FIGS. 3A and 3B show the configurations of the shift shaft and the shift lug according to the first embodiment of the invention, of which FIG. 3A is a plan view and FIG. 3B is a side view.

As shown in FIGS. 3A and 3B, in this embodiment, the two control fingers 51a, 51b are mounted in different rotational positions on the shift shaft 50. The two control fingers 51a, 51b are disposed in such a manner as to be offset from each other in the shifting direction in such a way that when the right-hand control finger 51a is positioned between the pair of claw portions 41 of the shift lug 40 which is in the shift position, the left-hand control finger 51b is situated in a withdrawal position which lies upper than the claw portions 41 of the other shift lug which is in the opposite shift position. That is, the control fingers 51a, 51b are mounted on the shift shaft 50 so as to be displaced with each other in the shifting direction. In other words, the control fingers 51a, 51b are displaced with each other in a circumferential direction of the shift shaft 50.

Figure 4:
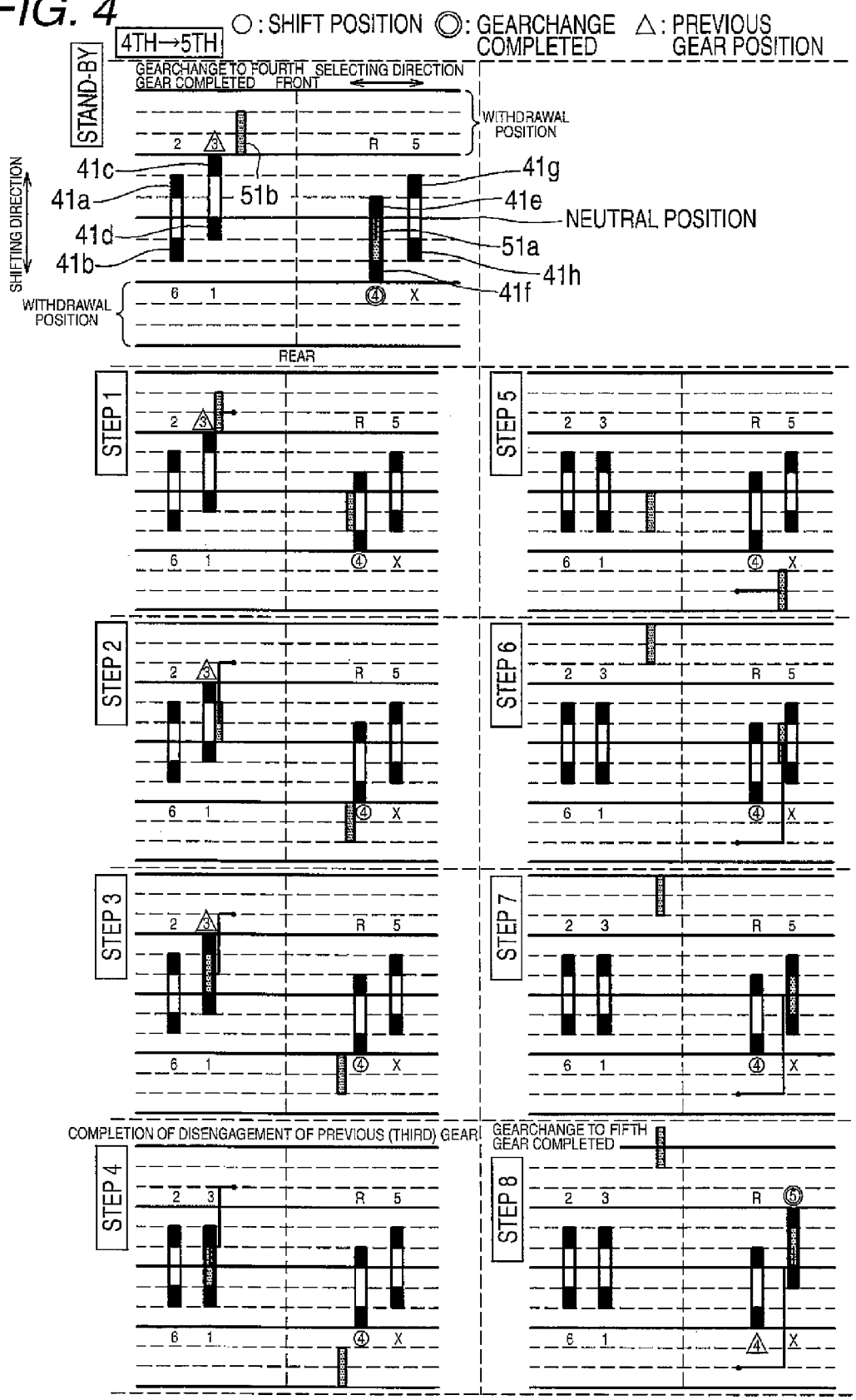
FIG. 4 is an explanatory diagram illustrating shifting of control fingers in changing gears according to the first embodiment of the invention.

FIG. 4 is an explanatory diagram which illustrates shifting of the control fingers 51 when a gearchange takes place according to the first embodiment. In this figure, as an example, shifting steps of the control fingers 51 are shown from the completion of a gearchange to the fourth speed gear by disengaging the previous third speed gear to the completion of a gearchange to the fifth speed gear.

In the figure, a vertical direction denotes the shifting direction and a horizontal direction denotes the selecting direction. It is understood that the shift lugs are positioned in a neutral position when they are located in a vertically central position as viewed in the figure. Each pair of claw portions 41 is made to be moved one scale vertically in the figure, and by being moved vertically outwards, the shift lug 40 on which the pair of claw portions so moved is provided is moved to the shift position, so that a gearchange is made to the gear which corresponds to the shift lug 40 so moved (or the gear is engaged) In addition, positions lying vertically further outwards than the claw portion 41 in the shift position in the figure denote the withdrawal positions where the control finger 51 lies upper than the claw portion 41. Additionally, the control fingers 51 are made to be moved one scale vertically from the vertical center in the figure when the shift-shaft 50 is rotated. (Stand-by state) This stand-by state is a state in which a gearchange to the fourth speed gear has just been completed. In the stand-by state, the right-hand control finger 51a has pushed an inner side of the fourth speed gear claw portion 41f so as to move it outwards, whereby the fourth speed gear is engaged. In this state, the third speed gear claw portion 41c is also moved outwards, and the left-hand control finger 51b is located in the withdrawal position which lies upper than the third speed gear claw portion 41c.

(Step 1) The control fingers 51a, 51b are moved to leftwards as viewed in the figure so that the right-hand control finger 51a comes out of the space between the fourth speed gear claw portion 41f and the reverse gear claw portion 41e.

(Step 2) The control fingers 51a, 51b are moved downwards in the figure, so that the left-hand control finger 51b is moved to a position in the shifting direction which lies between the third speed gear claw portion 41c, which is in the engaged state, and the first speed gear claw portion.

(Step 3) The control fingers 51a, 51b are moved leftwards in the figure, so that the left-hand control finger 51b is positioned between the third speed gear claw portion 41c and the first speed gear claw portion 41d.

(Step 4) The control fingers 51a, 51b are moved downwards to the neutral position in the figure, whereby the left-hand control finger 51b pushes an inner side of the first speed gear claw portion 41d so as to move it downwards. Consequently, the third speed gear claw portion 41c is moved to the neutral position, whereby the third speed gear is disengaged (completion of disengagement of the previous). As this occurs, the right-hand control finger 51a is located in the withdrawal position which lies upper (lower in the figure) than the fourth speed gear claw portion 41f which is in the engaged state.

(Step 5) The control fingers 51a, 51b are moved rightwards in the figure, so that the right-hand control finger 51a is brought into abutment with a left side of the reverse claw portion 41e.

(Step 5) The control fingers 51a, 51b are moved downwards in the figure, so that the right-hand control finger 51a is brought into abutment with an inner side of the fourth speed gear claw portion 41f.

(Step 6) The control fingers 51a, 51b are moved rightwards in the figure, so that the right-hand control finger 51a is brought into abutment with a left side of the parking gear claw portion 41h.

(Step 7) The control fingers 51a, 51b are moved rightwards in the figure, so that the right-hand control finger 51a is moved to a shift position between the fifth speed gear claw portion 41g and the parking gear claw portion 41h.

(Step 8) The control fingers 51a, 51b are moved upwards, so that the right-hand control finger 51a pushes an inner side of the fifth speed gear claw portion 41g so as to move the fifth speed gear claw portion 41g to a shift position, whereby a gearchange to the fifth speed gear is completed.

Thus, in the embodiment, the gearchange from the completion of engagement of the fourth speed gear to the completion of engagement of the fifth speed gear is completed through eight steps.

Next, shifting steps of control fingers 51 in a transmission unit according to the related art will be described as a comparison example.

Figure 5:
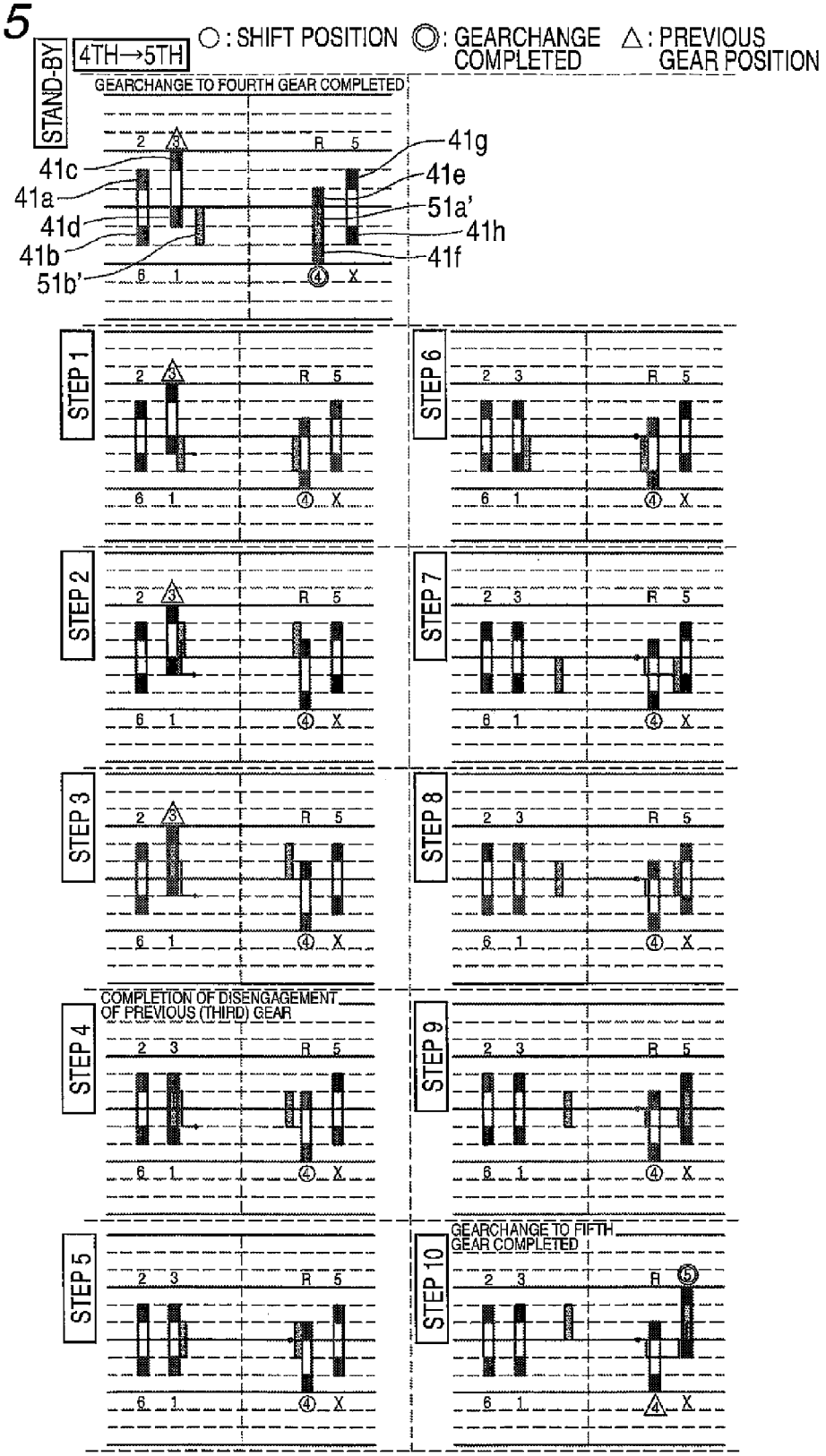
FIG. 5 is an explanatory diagram illustrating shifting of control fingers in changing gears according to a related art transmission.

FIG. 5 is an explanatory diagram which illustrates shifting of the control fingers 51 when a gearchange takes place, and shifting steps of the control fingers 51 are shown from the completion of a gearchange to the fourth speed gear by disengaging the previous third speed gear to the completion of a gearchange to the fifth speed gear.

In the transmission unit of the related art, control fingers 51a', 51b' are disposed in the same position with respect to the shifting direction and hence, they are not mounted in different rotational positions.

(Stand-by state) As with the embodiment of the invention, the right-hand control finger 51a' has pushed an inner side of the fourth speed gear claw portion 41f so as to move it outwards, whereby the fourth speed gear is engaged. In this state, the third speed gear claw portion 41c is also moved outwards.

(Step 1) The control fingers 51a', 51b' are moved leftwards in the figure, so that the left-hand control finger 51b' is brought into abutment with a right side of the first speed gear claw portion 41d.

(Step 2) The control fingers 51a', 51b' are moved to upper shift positions in the figure.

(Step 3) The control fingers 51a', 51b' are moved leftwards in the figure, so that the left-hand control finger 51b' is moved to the same horizontal position as the first speed gear claw portion 41d.

(Step 4) The control fingers 51a', 51b' are moved downwards to the neutral position in the figure, whereby the left-hand control finger 51b' pushes an inner side of the first speed gear claw portion 41d so as to move it downwards. Consequently, the third speed gear claw portion 41c is moved to the neutral position, whereby the third speed gear is disengaged (completion of disengagement of the previous gear).

(Step 5) The control fingers 51a', 51b' are moved rightwards in the figure, so that the right-hand control finger 51a' is brought into abutment with a left side of the reverse gear claw portion 41e.

(Step 6) The control fingers 51a', 51b' are moved downwards in the figure so as to be moved to lower shift positions in the figure.

(Step 7) The control fingers 51a', 51b' are moved rightwards in the figure, so that the right-hand control finger 51a' is brought into abutment with a left side of the parking gear claw portion 41h.

(Step 8) The control fingers 51a', 51b' are moved upwards to the neutral position in the figure.

(Step 9) The control fingers 51a', 51b' are moved rightwards in the figure, so that the right-hand control finger 51a' is moved to the same horizontal position as the fifth speed gear claw portion 41g.

(Step 10) The control fingers 51a', 51b' are moved upwards in the figure, so that the right-hand control finger 51a' pushes an inner side of the fifth speed gear claw portion 41g so as to move the fifth speed gear claw portion 41g to a shift position, whereby the gearchange to the fifth speed gear is completed.

As has been described heretofore, in the transmission unit of the related art, ten steps are required from the completion of gearchange to the fourth speed gear to the completion of gearchange to the fifth speed gear.

In the first embodiment, the control fingers 51a, 51b are mounted in the different rotational positions, and hence, even in the event that one of the control fingers 51 is moved in the selecting direction from a state in which it is positioned between the pair of claw portions 41 of the shift lug 40, the other control finger 51 is located in the withdrawal position which lies upper than the pair of claw portions 41 of the other lug 40, and hence no interference occurs. Consequently, the necessity is obviated of causing the control finger 51 to bypass the claw portions 41, and hence, when the other control finger 51 passes through the pair of claw portions 41 of one shift lug 40 to be moved to right a side of the pair of claw portions 41 of the adjacent shift lug 40, according to the transmission unit of the related art, four steps (from step 4 to step 8) are required, whereas according to the first embodiment, the shifting concerned is completed in two steps (from step 4 to step 6).

In this way, in the embodiment, since the number of shifting steps of the control fingers 51 can be reduced largely when a gearchange takes place, a reduction in shift time can be realized. In addition, also in changing gears to the other speed gears, the number of shifting steps of the control fingers 51 can be reduced.

In the first embodiment, since the necessity is obviated of expanding largely the space between the pair of claw portions of the shift lug 40 relative to the control finger 51 as has taken place in the related art transmission unit, once it is moved, the control finger 51 can be brought into abutment with the claw portion 41 immediately, thereby making it possible to enable a quick gearchange.

Figure 6:
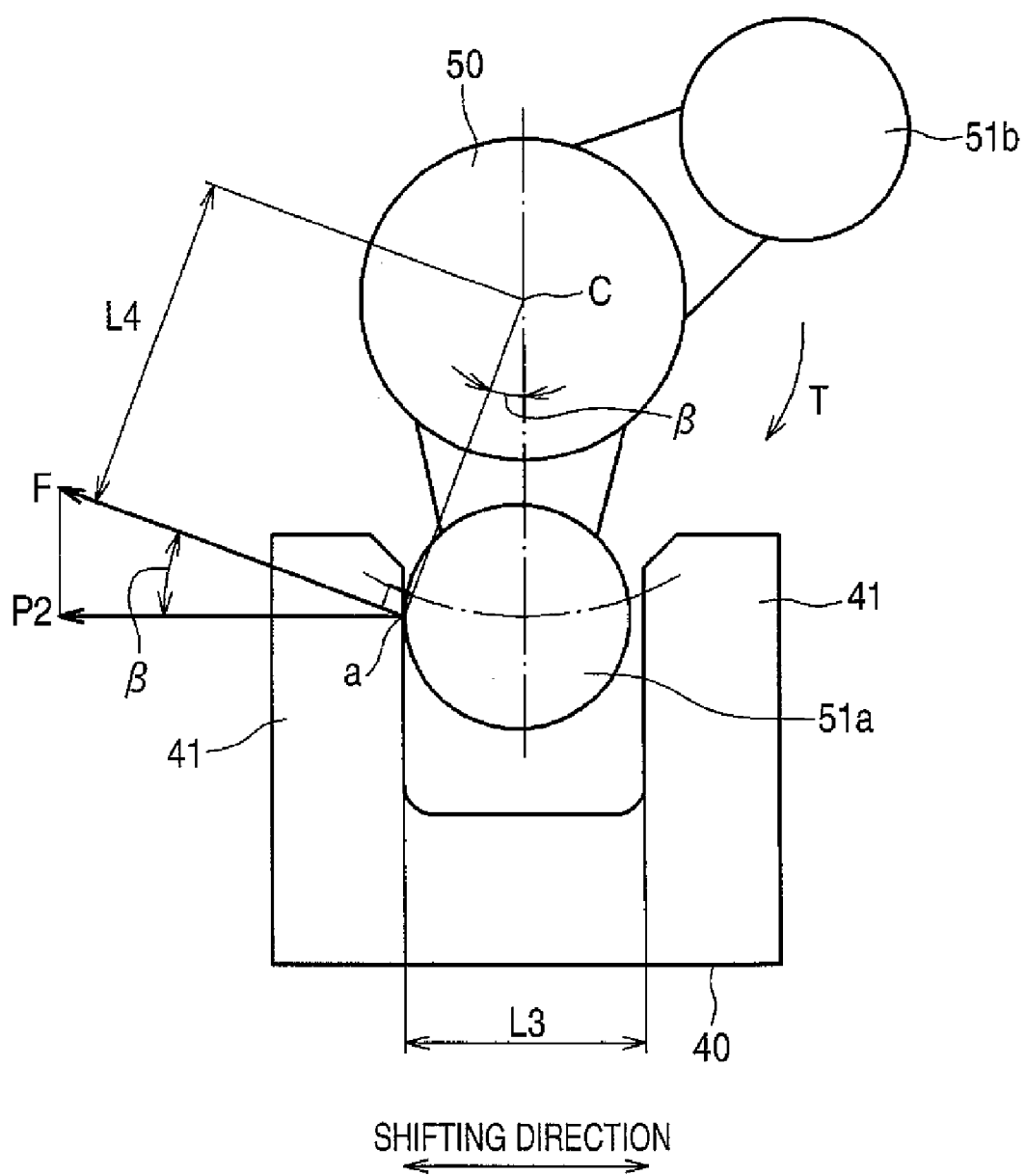
FIG. 6 is a schematic diagram showing the construction of a shifting mechanism of the shift lug according to the first embodiment.

FIG. 6 is a schematic diagram showing the construction of the shifting mechanism of the shift lug according to the embodiment.

In this embodiment, since the space L3 between the pair of claw portions 41 can be set relatively narrow, the control finger 51 is allowed to push the claw portion 41 while it is tilted little in the shifting direction. Assuming that a force exerted on the claw portion 41 by a rotational torque T of the shift shaft 50 then is a tangential force F, a distance from a contact point a between the control finger 51 and the claw portion 41 to an axial center C of the shift shaft 50 is a distance L4, and a tilt angle of a line which connects the contact point a with the axial center C of the shift shaft 50 towards the shifting direction is an angle β, a component of the tangential force F in the shifting direction, that is, a component force P2 which is a force which shifts the claw portion 41 in the shifting direction is obtained by the following equation (2).

$$P2 = F \times \cos\beta = T \times \cos\beta/L4 \qquad (2)$$

Consequently, in this embodiment, since the space L3 between the pair of claw portions 41 is relatively narrow and hence the angle β is suppressed to a smaller angle, as is expressed by the equation (2), the component force 2 is reduced largely relative to the tangential force F in no case. In addition, since the distance L4 remains substantially constant irrespective of the angle β, the rotational torque T of the shift shaft 50 is transmitted with good efficiency as a force which pushes the claw portion 41 in the shifting direction, thereby making it possible to move the shift lug 40 in the shifting direction with good efficiency.

Figure 7:
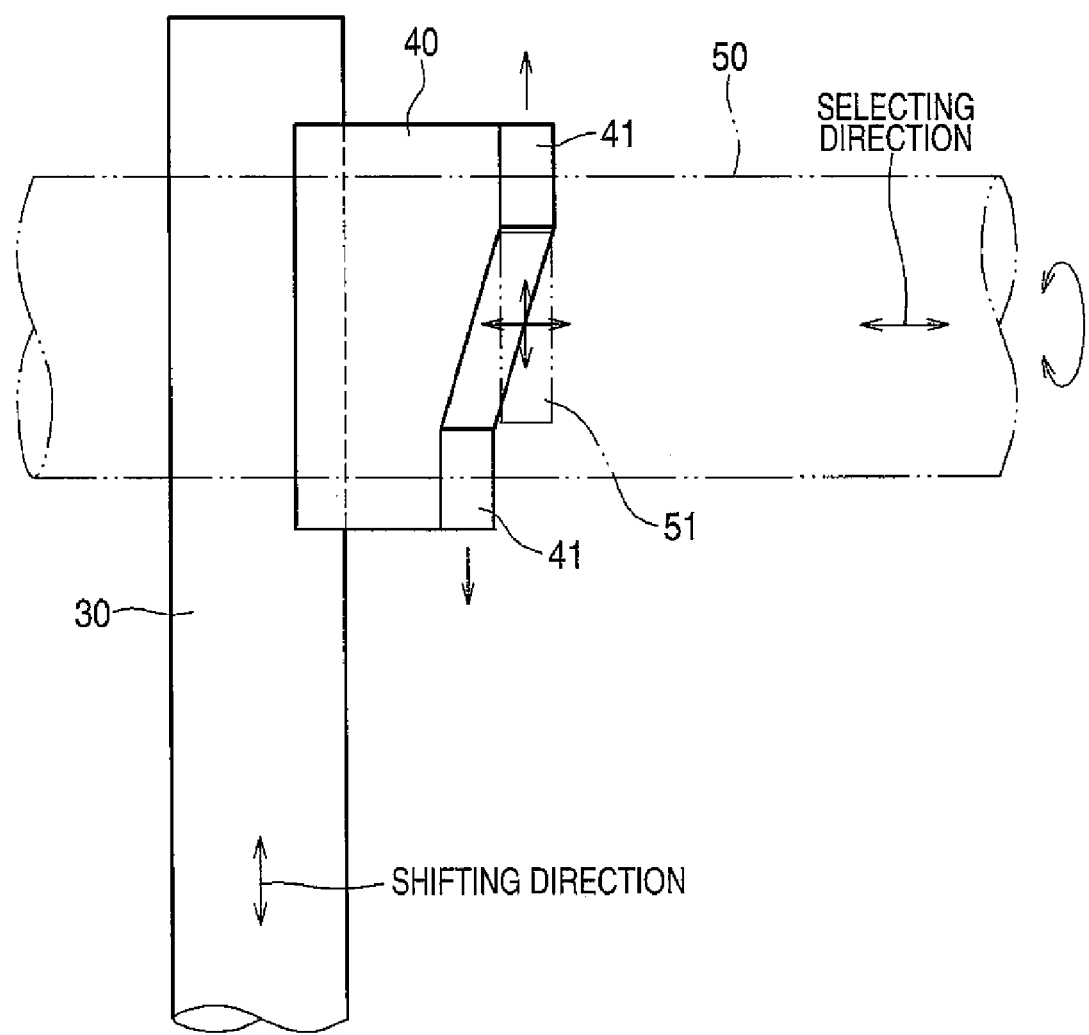
FIG. 7 is a plan view showing the configuration of a shift lug according to a second embodiment.

FIG. 7 is a plan view showing the configuration of a shift lug 40 according to a second embodiment of the invention.

In the second embodiment, as is shown in FIG. 7, a pair of claw portions 41 of a shift lug 40 is formed in such a manner as to be offset from each other in a selecting direction. That is, the confronting claw portions 41 are displaced with each other in the selecting direction. Furthermore, four control fingers 51, that is, a first control finger 51c, a second control finger 51d, a third control finger 51e and a fourth control finger 51f, are provided on a shift shaft 50 sequentially in that order from a right-hand end thereof in such a manner as to be spaced apart from one another in the selecting direction.

Figure 8:
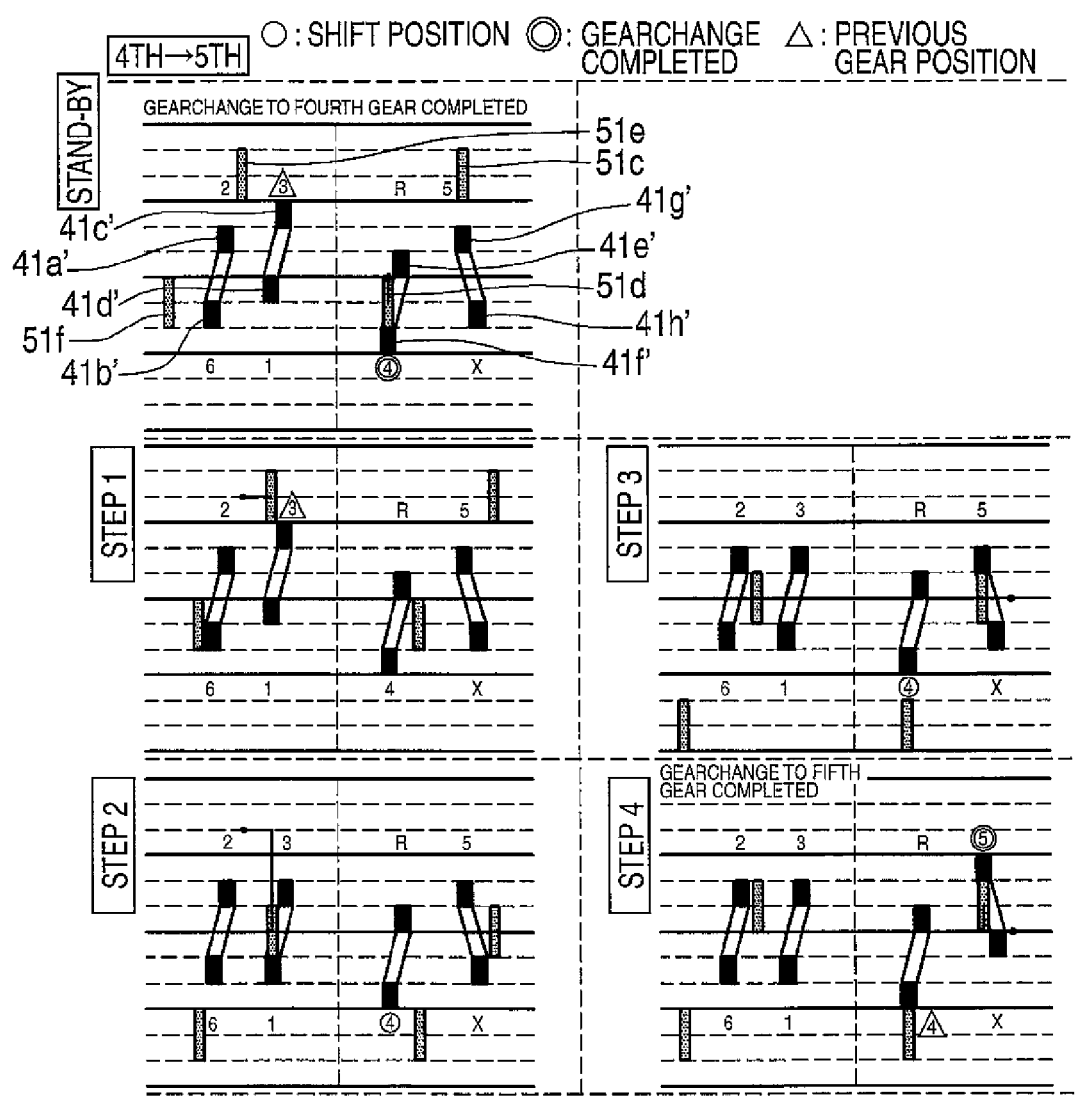
FIG. 8 is an explanatory diagram illustrating shifting of control fingers in changing gears according to the second embodiment of the invention.
Figure 9:
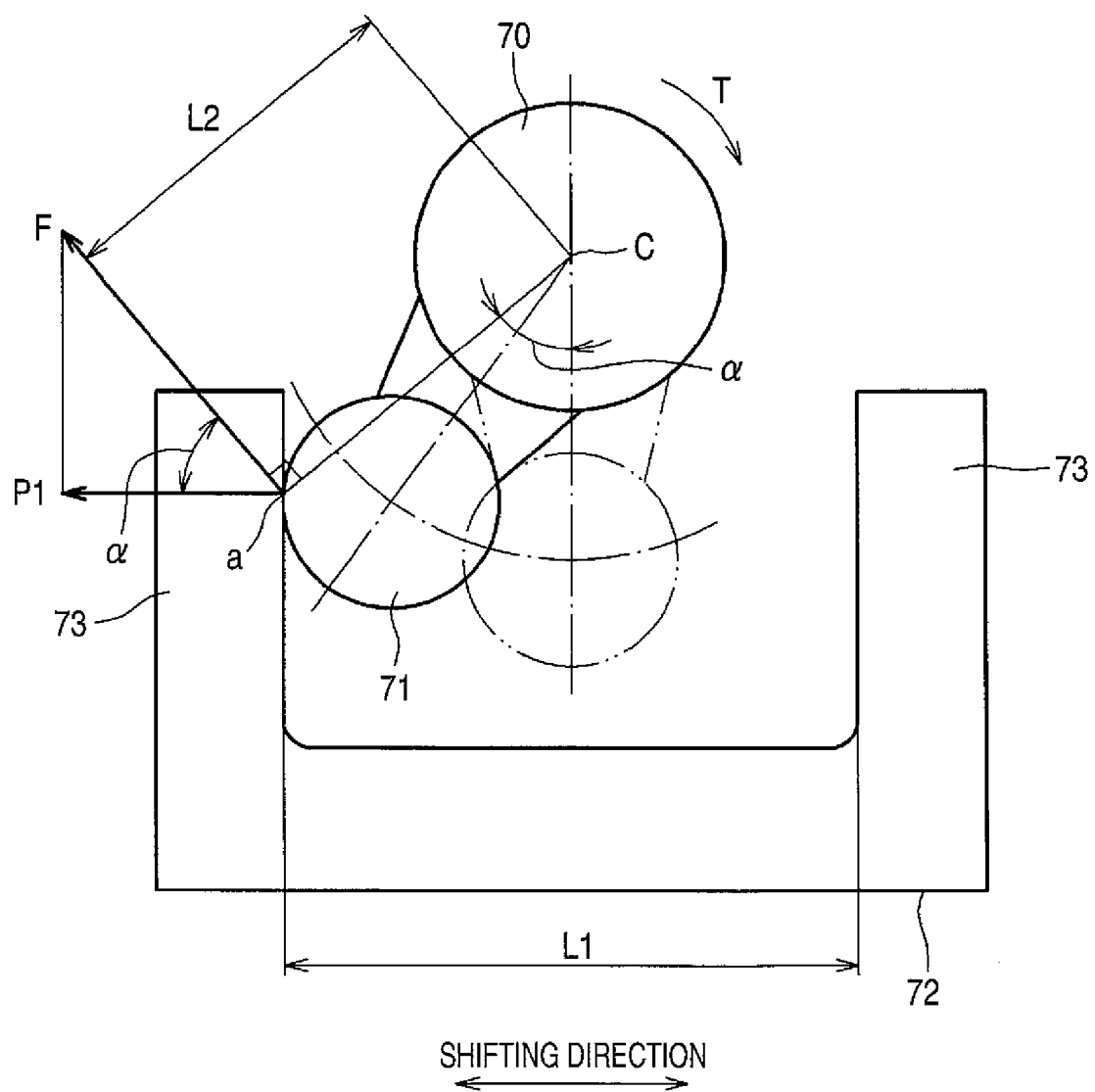
FIG. 9 is a schematic diagram showing the construction of a shifting mechanism of the shift lug according to the related art transmission.

FIG. 8 is an explanatory diagram showing shifting of the controlling fingers when a gearchange takes place according to the second embodiment and shows shifting steps of the control fingers 51 from the completion of a gearchange to the fourth speed gear by disengaging the previous third speed gear to the completion of a gearchange to the fifth speed gear.

As is shown in FIG. 8, as with the right-hand control finger 51c and the left-hand control finger 51b of the first embodiment, the first control finger 51c and the second control finger 51d are mounted in different rotational positions, and the third control finger 51e and the fourth control finger 51f are mounted in different rotational position. In addition, the first control finger 51c and the third control finger 51e are mounted in the same rotational position relative to the shift shaft 50, and the second control finger 51d and the fourth control finger 51f are mounted in the same rotational positions relative to the shift shaft 50 (as viewed in the figure, each pair being located in the same vertical position).

(Stand-by state) The second finger 51d has pushed an inner side of the fourth speed gear claw portion 41f' so as to move it outwards, whereby the fourth speed gear is engaged. In this state, the third speed gear claw portion 41c' is also moved outwards.

(Step 1) The control fingers 51 are moved rightwards as viewed in the figure, so that the third control finger 51e is moved to the same horizontal position as the first speed gear claw portion 41d'.

(Step 2) The third control finger 51e is moved downwards to the neutral position in the figure, whereby the third control finger 51e pushes an inner side of the first speed gear claw portion 41d' so as to move it downwards. Consequently, the third speed gear claw-portion 41c' is moved to the neutral position, whereby third speed gear is disengaged (completion of disengagement of the previous gear).

(Step 3) The control fingers 51 are moved leftwards in the figure, so that the first control finger 51c is moved to the same horizontal position as the fifth speed gear claw portion 41g'.

(Step 4) The control fingers 51 are moved upwards in the figure, so that the first control finger 51c pushes an inner side of the fifth speed gear claw portion 41g' so as to move the fifth speed gear claw portion 41g' to a shift position, whereby the gearchange to the fifth speed gear is completed.

Thus, according to the second embodiment, the gearchange from the completion of gearchange to the fourth speed gear to the completion of gearchange to the fifth speed gear can be completed in four steps, thereby making it possible to reduce largely the number of shifting steps of the control fingers 51.

In the second embodiment, since not only are the control fingers 51 mounted in the different rotational positions but also the pair of claw portions 41 of the shift lug 40 is formed in such a manner as to be offset from each other in the selecting direction, for example, the control finger 51 which is located in the withdrawal position can be moved between the pair of claw portions 41 of any of the shift lugs 40 in at least two steps (for example, two steps from the stand-by state).

In addition, in the second embodiment, since the four control fingers 51 are provided, when shifting the shift lug 40, by using any of the four control fingers 51 appropriately, not only can the number of shifting steps of the control finger 51 be reduced but also an increase in shifting distance in the shifting direction can be suppressed. In particular, in the invention, the control fingers 51 are mounted in the different rotational positions, and in such a condition, for example, when one control finger 51 is positioned between the pair of claw portions of the shift lug 40, the other control finger 51 is located in the withdrawal position, and even though the control fingers 51 are moved therefrom in the selecting direction, no interference with the claw portions 41 takes place, whereby the number of control fingers 51 can be increased without increasing the necessity of claw portion 41 avoidance operation.

In addition, the offsetting direction of the claw portions 41, the number of control fingers 51 and the rotational positions where the control fingers 51 are mounted may be set as required in accordance with the number and arrangement of speed gears.

According to an aspect of the invention, since the plurality of shift members are disposed in such a manner as to be offset from each other in the shifting direction, by setting the offset amount appropriately, for example, when one of the shift members is positioned between the pair of claw portions of shift lug, the shift member can be moved in the selecting direction with the other shift member kept out of interference with the claw portion of the other shift lug. Consequently, since the plurality of shift members can be provided without an increase in opportunity for the shift members to interfere with the claw portions when the shift members are moved in the selecting direction, the shifting of the shift members can be simplified without expanding largely the space between the pairs of claw portions, thereby making it possible to attain a quick and efficient gearchange.

According to an aspect of the invention, the shift member can be moved in the shifting direction and the selecting direction by rotating and shifting the shaft in the selecting direction by the actuator. Consequently, the shifting mechanism for shifting the shift member in the shifting direction and the selecting direction can be realized with the simple configuration.

According to an aspect of the invention, by setting appropriately the offset direction of the claw portions depending upon the arrangement of the shift rails, in changing gears, when the shift members are moved at least once in the sliding direction and the shifting direction, respectively, the claw portion can be pushed by the shift member so as to move the shift lug in the shifting direction. Consequently, the movements of the shift members in changing gears can be simplified further.

What is claimed is:

1. A transmission provided with a dual-clutch-type transmission mechanism, comprising:
    a plurality of shift members which are adapted to be moved integrally in a shifting direction and a selecting direction;
    a plurality of shift lugs which are arranged in the selecting direction, each of the shift lugs having a pair of claw portions spaced apart from each other in the shifting direction; and
    a shift fork which is connected to one of the shift lugs via a shift rail and performs a gear shift operations, wherein
    the shift members are moved by an actuator so that one of the shift members pushes one of the pair of claw portions of one of the shift lugs in the shifting direction to thereby selectively move the one of the shift lugs in the shifting direction so as to cause the shift fork to perform the gear shift operation via the shift rail, and
    while first one of the shift lugs is held at a shift position, a gear shift operation of second one of the shift lugs is performed,
    wherein
    while one of the shift members is inserted into a space between the pair of claw portions, to make the shift members moveable in the selecting direction without interfering with the shift lugs, the other of the shift members is disposed as to be offset relative to the one of the shift members in the shifting direction such that the other of the shift members is positioned at a retracting position outside the pair of claw portions in the shifting direction.

2. The transmission as set forth in claim 1, wherein:
    the transmission further includes a shaft which has an axis extended in the selecting direction and is adapted to be moved in the selecting direction and is rotated in the shifting direction by the actuator, and
    the shift members project from an outer circumference of the shaft so as to form a pawl shape.

3. The transmission as set forth in claim 1 or 2, wherein:
    the pair of claw portions are disposed so as to be offset from each other with an offset quantity than a width of the one of the shift members in the selecting direction so as to make the one of the shift members movable in a direction opposite to the shifting direction while the first one of the shift lugs is held at the shift position after the one of the shift members pushes the first one of the shift lugs in the shifting direction.

4. The transmission as set forth in claims 2 or 3, wherein:
    the axis of the shaft is arranged on an approximately straight line extending in an extending direction of the pair of claw portions from a center position of the space between the pair of claw portions in the shifting direction at a neutral position of one of the shift lugs.

5. The transmission as set forth in any one of claim 1, wherein:
    a width of the one of the shift members in the shifting direction and the space between the pair of claw portions in the shifting direction are substantially equal.

* * * * *